(12) United States Patent
Huang et al.

(10) Patent No.: US 12,403,982 B2
(45) Date of Patent: Sep. 2, 2025

(54) CENTRALLY-MOUNTED DRIVE MECHANISM USED FOR POWER-ASSISTED BICYCLE, AND POWER-ASSISTED BICYCLE

(71) Applicant: SUZHOU WANJIA ELECTRIC CO., LTD., Jiangsu (CN)

(72) Inventors: Fuming Huang, Suzhou (CN); Junning Huang, Suzhou (CN); Cheng Ma, Suzhou (CN); Hualin Cai, Suzhou (CN); Junhui Yu, Suzhou (CN)

(73) Assignee: SUZHOU WANJIA ELECTRIC CO., LTD., Jiangsu (CN)

( * ) Notice: Subject to any disclaimer, the term of this patent is extended or adjusted under 35 U.S.C. 154(b) by 685 days.

(21) Appl. No.: 17/776,526

(22) PCT Filed: Nov. 3, 2020

(86) PCT No.: PCT/CN2020/126022
§ 371 (c)(1),
(2) Date: May 12, 2022

(87) PCT Pub. No.: WO2021/098500
PCT Pub. Date: May 27, 2021

(65) Prior Publication Data
US 2022/0379996 A1     Dec. 1, 2022

(30) Foreign Application Priority Data

Nov. 19, 2019 (CN) ......................... 201911134539.5
Apr. 17, 2020 (CN) ......................... 202010304310.8

(51) Int. Cl.
| | |
|---|---|
| *B62M 6/55* | (2010.01) |
| *B62J 43/13* | (2020.01) |
| *B62J 43/20* | (2020.01) |
| *B62M 6/90* | (2010.01) |
| *B62M 11/02* | (2006.01) |

(52) U.S. Cl.
CPC ............... *B62M 6/55* (2013.01); *B62J 43/13* (2020.02); *B62J 43/20* (2020.02); *B62M 6/90* (2013.01); *B62M 11/02* (2013.01)

(58) Field of Classification Search
CPC . B62J 43/20; B62J 43/13; B62M 6/90; B62M 6/55; B62M 11/02; B62K 2204/00
(Continued)

(56) References Cited

U.S. PATENT DOCUMENTS 5,375,676 A * 12/1994 Takata ..................... B62M 6/45
                                                                           180/65.285
5,829,546 A * 11/1998 Tseng ....................... B62M 6/55
                                                                             180/220
(Continued)

FOREIGN PATENT DOCUMENTS

| CN | 205327312 U | 6/2016 |
|---|---|---|
| CN | 105449921 B * | 10/2017 |

(Continued)

OTHER PUBLICATIONS

European Patent Office, Office Action, EP Patent Application No. 20208011.5, Mar. 17, 2023, six pages.
(Continued)

*Primary Examiner* — Jacob D Knutson
*Assistant Examiner* — Morgan Rappe
(74) *Attorney, Agent, or Firm* — Kilpatrick Townsend & Stockton LLP (57) ABSTRACT

A centrally-mounted drive mechanism used for a power-assisted bicycle, and a power-assisted bicycle are provided. The centrally-mounted drive mechanism includes an outer casing, an electric motor, a planetary gear mechanism in a transmission connection with an output shaft of the electric motor, a bevel gear driving end, and a bevel gear driven end that meshes with the bevel gear driving end, said bevel gear (Continued)

driven end being connected to a crankset. The planetary gear mechanism includes a planetary gear and a planetary gear output bracket, and a bevel gear support base that is sleeved on the outer part of the planetary gear output bracket. A clutch is disposed between the planetary gear output bracket and the bevel gear support base, and a transmission connection is formed via the clutch between the planetary gear output bracket and the bevel gear support base.

9 Claims, 5 Drawing Sheets

(58) Field of Classification Search
USPC .......................................... 180/220
See application file for complete search history.

(56) References Cited

U.S. PATENT DOCUMENTS

| | | | |
|---|---|---|---|
| 6,554,730 B1* | 4/2003 | Sakai | B62M 6/55 |
| | | | 475/195 |
| 8,646,560 B2* | 2/2014 | Chan | B62M 25/08 |
| | | | 180/206.3 |
| 2018/0111660 A1* | 4/2018 | Liu | B62M 6/55 |
| 2018/0281897 A1* | 10/2018 | Huang | F16D 41/06 |
| 2019/0111998 A1 | 4/2019 | Noda et al. | |
| 2019/0112003 A1 | 4/2019 | Noda et al. | |
| 2019/0308689 A1* | 10/2019 | Kitahara | B62M 3/003 |

FOREIGN PATENT DOCUMENTS

| | | |
|---|---|---|
| CN | 206691312 U * | 12/2017 |
| CN | 109665037 A | 4/2019 |
| CN | 110282067 A | 9/2019 |
| CN | 208085921 U | 11/2019 |
| DE | 29911858 U1 | 10/1999 |
| EP | 1070660 A1 | 1/2001 |

OTHER PUBLICATIONS

PCT International Search Report and Written Opinion, International Application No. PCT/CN2020/126022, dated Jan. 27, 11 Pages.
European Patent Office, Extended European Search Report and Opinion, EP Patent Application No. 20208011.5, Mar. 19, 2021, nine pages.

* cited by examiner

CENTRALLY-MOUNTED DRIVE MECHANISM USED FOR POWER-ASSISTED BICYCLE, AND POWER-ASSISTED BICYCLE

The application is a 35 U.S.C. 371 Patent Application of PCT Application No. PCT/CN2020/126022, titled "CENTRALLY-MOUNTED DRIVE MECHANISM USED FOR POWER-ASSISTED BICYCLE, AND POWER-ASSISTED BICYCLE," filed on Nov. 3, 2020 which claims the priorities to Chinese Patent Application No. 201911134539.5 titled "POWER-ASSISTED BICYCLE AND CENTRALLY MOUNTED DRIVING MECHANISM FOR THE SAME", filed with the China National Intellectual Property Administration on Nov. 19, 2019, and Chinese Patent Application No. 202010304310.8 titled "CENTRALLY MOUNTED DRIVING MECHANISM FOR POWER-ASSISTED BICYCLE AND POWER-ASSISTED BICYCLE", filed with the China National Intellectual Property Administration on Apr. 17, 2020, the disclosures of which are incorporated herein by reference in their entireties.

FIELD

The present application relates to the technical field of assembly of reducing mechanisms, and in particular to a centrally mounted driving mechanism for a power-assisted bicycle. The present application further relates to a power-assisted bicycle having the centrally mounted driving mechanism.

BACKGROUND

In the conventional technology, a power-assisted bicycle generally employs a centrally mounted driving mechanism. The centrally mounted driving mechanism generally includes the motor and the planetary gear connected with the motor. The output end of the planetary gear is connected to the bevel gear to reduce the speed, the bevel gear is connected to the crankset support to drive the crankset to rotate, so as to provide assistance for the power-assisted bicycle. According to the centrally mounted driving mechanism in the conventional technology, the output end of the planetary gear, that is, the planetary gear output bracket requires a positioning structure, and a double row bearing positioning structure is usually employed in the conventional technology. Besides, the driving end of the bevel gear is also required to be provided with a separate positioning structure. The positioning structures of the output end of the planetary gear and the driving end of the bevel gear lead to a large size of the centrally mounted driving mechanism in the axial direction, making the driving mechanism not compact. The adjacent connecting members of the centrally mounted driving mechanism are sequentially arranged and respectively positioned in the axial direction of the motor, leading to a large size of the motor in the axial direction, which reduces the available mounting space on the seat tube of the bicycle frame, making it unable to mount the battery with larger capacity.

Therefore, a technical problem to be solved by those skilled in the art is to avoid the great axial length of the conventional centrally mounted driving mechanism caused by the arrangement that the adjacent connecting members are sequentially arranged and respectively positioned in the axial direction of the motor.

SUMMARY

In view of this, an object of the present application is to provide a centrally mounted driving mechanism for a power-assisted bicycle. The centrally mounted driving mechanism can reserve enough length space for the seat tube of the bicycle frame by reducing the axial length, so as to accommodate a battery with larger capacity, so that the power-assisted bicycle has a greater output power and a longer battery life.

Another object of the present application is to provide a power-assisted bicycle having the centrally mounted driving mechanism.

In order to achieve the objects, a centrally mounted driving mechanism for a power-assisted bicycle is provided according to the present application, which includes a housing, a motor for providing a driving force, a planetary gear mechanism coaxially connected with a motor output shaft, a bevel gear driving end and a bevel gear driven end engaged with the bevel gear driving end. The bevel gear driven end is connected with a crankset, and the planetary gear mechanism includes a planetary gear and a planetary gear output bracket. The centrally mounted driving mechanism further includes a bevel gear support sleeved outside the planetary gear output bracket, a clutch is provided between the planetary gear output bracket and the bevel gear support, and the planetary gear output bracket is in transmission connection with the bevel gear support through the clutch; the bevel gear driving end is coaxially and fixedly connected with the bevel gear support, and a support assembly is provided outside the bevel gear support, and the support assembly is configured to support the planetary gear output bracket and the bevel gear driving end.

Preferably, the planetary gear output bracket has a shaft portion. The bevel gear support has a second annular protrusion, and the second annular protrusion surrounds the shaft portion. The clutch is arranged between the second annular protrusion and the planetary gear output bracket, and the clutch is fitted with and connected to the bevel gear support and the planetary gear output bracket, to realize the connection and separation between the bevel gear support and the planetary gear output bracket. And the support assembly is arranged outside the second annular protrusion.

Preferably, the bevel gear support is provided with a first annular protrusion located at an inner side of the second annular protrusion. The bevel gear driving end is connected to an inner wall of the first annular protrusion. A groove is provided at an end of the shaft portion away from the planetary gear. The first annular protrusion is inserted into the groove, and a gap is provided between the first annular protrusion and an inner wall of the groove.

Preferably, a sliding bearing is provided at each of two ends of the clutch, and the sliding bearing is supported between the shaft portion and the second annular protrusion.

Preferably, the bevel gear support is cup-shaped and has a bottom connected to an end of the second annular protrusion. The bottom is provided with a through hole, and the through hole is configured for fixed connection of the bevel gear driving end.

Preferably, the support assembly includes a first bearing and a second bearing arranged to be spaced apart from each other, and the first bearing and the second bearing are respectively arranged around a side portion of the second annular protrusion.

Preferably, the first bearing is arranged at an end of the side portion close to the planetary gear, and the second bearing is arranged at another end of the side portion away from the planetary gear. An outer diameter of the first bearing is less than that of the second bearing.

Preferably, the centrally mounted driving mechanism further includes a crankset support, and the bevel gear driven end is connected to the crankset through the crankset support. A bearing assembly for supporting and positioning the crankset support is provided between the crankset support and the housing.

Preferably, a gasket is provided on an upper end face of the planetary gear, and the gasket is configured for preventing the planetary gear from being worn and preventing the planetary gear from playing in an axial direction thereof.

A power-assisted bicycle is further provided according to the present application, which includes the centrally mounted driving mechanism, a down tube and a battery pack. The centrally mounted driving mechanism and the battery pack are mounted in the down tube.

Compared with the conventional technology, the centrally mounted driving mechanism for the power-assisted bicycle and the power-assisted bicycle according to the present application has the following advantages. The length of the centrally mounted driving mechanism is relatively small in the axial direction of the motor, the structure is compact and the size is small; the centrally mounted driving mechanism has fewer positioning parts, thus the structure is more reliable and the operation stability is better; the power-assisted bicycle employing the centrally mounted driving mechanism may be mounted with a battery with larger capacity, and thereby the battery life is longer.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF THE EMBODIMENTS

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of protection of the present application.

An object of the present application is to provide a centrally mounted driving mechanism for a power-assisted bicycle, and the centrally mounted driving mechanism has the advantages of having a small axial length, compact structure and small size. Another object of the present application is to provide a power-assisted bicycle including the centrally mounted driving mechanism. The centrally mounted driving mechanism is mounted in a frame pipe of the power-assisted bicycle, which reserves more space to accommodate a battery with larger capacity, so that the power-assisted bicycle has greater output power and a longer battery life.

In order to make those skilled in the art better understand technical solutions of the present application, the present application is further illustrated in detail with reference to the accompanying drawings and specific embodiments hereinafter.

It should be noted that, the orientation terms such as "upper, lower, left, right" in the description hereinafter are defined based on the drawings of the specification.

Figure 1:
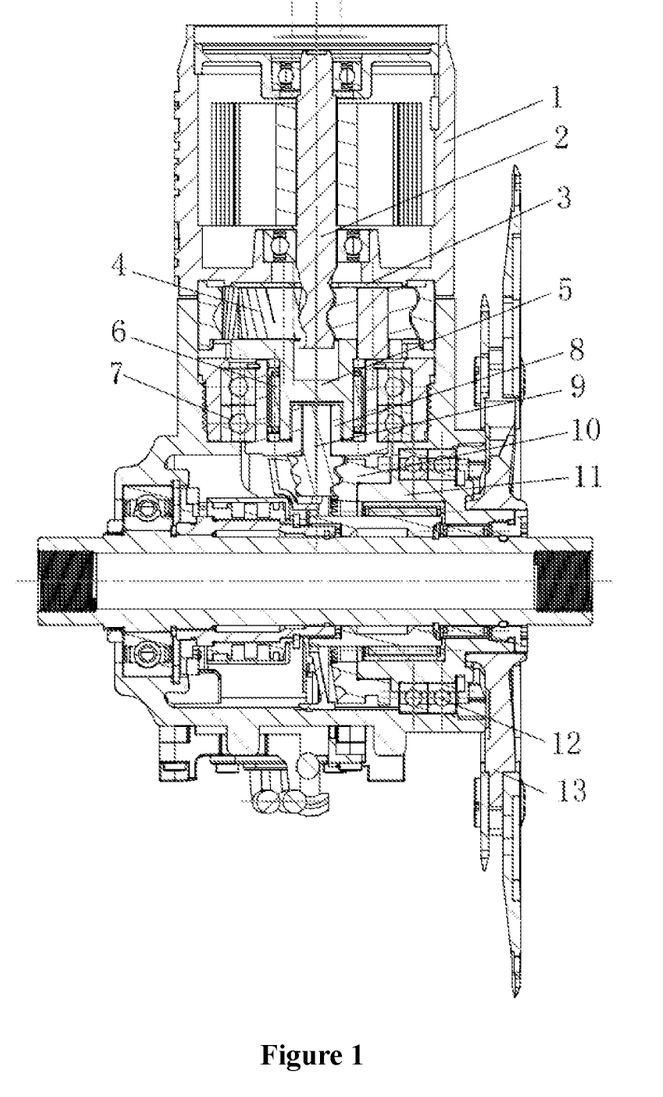
FIG. 1 is a schematic sectional view showing a centrally mounted driving mechanism for a power-assisted bicycle according to a first preferred embodiment of the present application.

As shown in FIG. 1, a centrally mounted driving mechanism for a power-assisted bicycle is provided according to a first preferred embodiment of the present application. The centrally mounted driving mechanism includes a motor 2, a planetary gear mechanism, a clutch 6, a bevel gear mechanism, a crankset support 11 and a crankset 13. The bevel gear mechanism includes a bevel gear support 8, a bevel gear driving end 9 and a bevel gear driven end 10. An output shaft of the motor 2 is in transmission connection with the planetary gear mechanism, and the motor 2 is configured to provide a driving force. The planetary gear mechanism includes a planetary gear 4 and a planetary gear output bracket 5. The planetary gear 4 is in transmission connection with the output shaft of the motor 2, the planetary gear output bracket 5 is inserted into the bevel gear support 8, and the clutch 6 is mounted between the planetary gear output bracket 5 and the bevel gear support 8. The bevel gear support 8 is connected to the bevel gear driving end 9, and the bevel gear driving end 9 is connected with the bevel gear driven end 10 configured for driving the crankset support 11 to rotate. The bevel gear driven end 10 is fixedly connected to or integrally formed with the crankset support 11. Thus, an output end of the planetary gear is connected to the bevel gear mechanism for speed reduction, and finally, the bevel gear mechanism is connected to the crankset support 11 to drive the crankset 13 to rotate, so as to assist the power-assisted bicycle.

Figure 2:
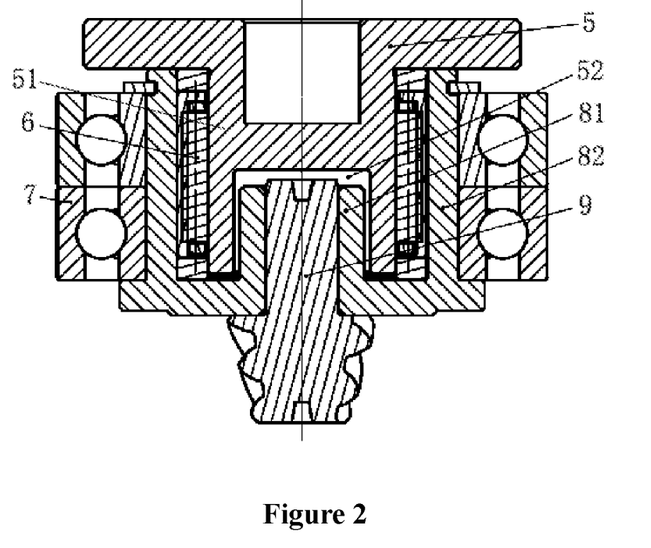
FIG. 2 is a schematic structural view showing the connection between a planetary gear output bracket and a bevel gear support in the first preferred embodiment.
Figure 3:
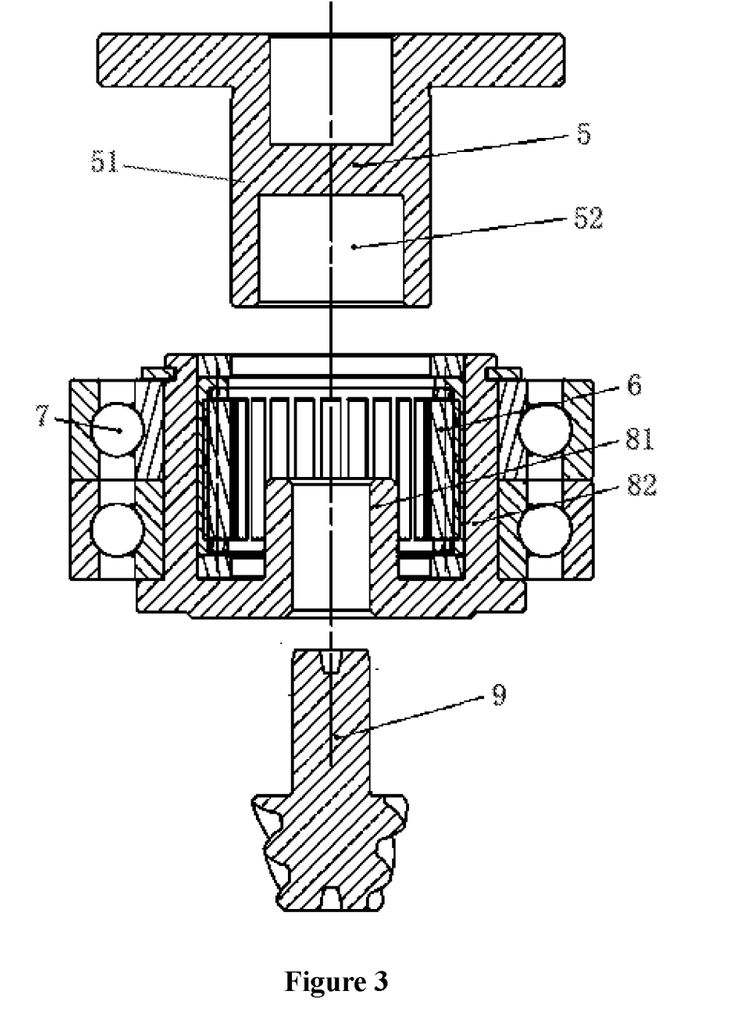
FIG. 3 is a schematic view showing an assembly structure of FIG. 2.

Specifically, referring to FIGS. 2 and 3, the planetary gear output bracket 5 has a shaft portion 51, and the bevel gear support 8 has a second annular protrusion 82, and the second annular protrusion 82 surrounds the shaft portion 51. The clutch 6 is arranged between an inner wall of the second annular protrusion 82 and the shaft portion 51, and the clutch 6 is fitted with and connected to the bevel gear support 8 and the planetary gear output bracket 5, to realize the connection and separation between the bevel gear support 8 and the planetary gear output bracket 5. Thus, in a case that the motor 2 is powered off or does not start, the transmission connection between the crankset 13 and the motor 2 can be disconnected by clutch 6, thus avoiding the rotation of the motor 2 when a user pedals the power-assisted bicycle. A needle roller clutch is preferably employed, and the arrangement of the clutch 6 may refer to the conventional technology.

Further, the bevel gear support 8 is provided with a first annular protrusion 81 located at an inner side of the second annular protrusion 82. The first annular protrusion 81 is coaxial with the second annular protrusion 82, and a preset gap is provided between the second annular protrusion 82 and the first annular protrusion 81. A groove 52 is provided at an end of the shaft portion 51 away from the planetary gear 4, and the groove 52 is arranged to be coaxial with the planetary gear output bracket 5. The first annular protrusion 81 is inserted into the groove 52, and a gap is reserved between the first annular protrusion 81 and an inner wall of the groove 52. The bevel gear driving end 9 is connected with an inner wall of the first annular protrusion 81. By inserting the first annular protrusion 81 into the groove 52, a connected length of the planetary gear output bracket 5 and the bevel gear driving end 9 is reduced, the connection is strong, and the axial length of the centrally mounted driving mechanism can be further reduced.

In addition, an outer wall of the second annular protrusion 82 is connected with a support assembly 7 configured for supporting and positioning the bevel gear support 8. A housing 1 is provided outside the planetary gear output bracket 5 for protection, and a bearing assembly 12 configured for supporting and positioning the crankset support 11 is provided between the housing 1 and the crankset support 11. Certainly, according to practical requirements, the support assembly 7 and the bearing assembly 12 may be arranged as two bearings arranged side by side or as a double row bearing.

The support assembly 7 is arranged around the outer wall of the second annular protrusion 82, and the support assembly 7 is connected with the housing 1, so that the bevel gear support 8 and the planetary gear output bracket 5 are supported at the same time. This arrangement not only simplify the structure, reduce the number of positioning members, but also reduce the axial length of the centrally mounted driving mechanism, thus an overall structure of the centrally mounted driving mechanism is more compact, and the size is smaller.

Further, the first annular protrusion 81 is fixedly connected with the bevel gear driving end 9, the bevel gear driving end 9 is configured to transmit motion and power of the bevel gear support 8, and an outer wall of the bevel gear driving end 9 may be in interference fit with the inner wall of the first annular protrusion 81. Certainly, according to practical requirements, in the premise that a torque transmission function is satisfied, the bevel gear driving end 9 may be welded to the bevel gear support 8. Certainly, the bevel gear driving end 9 may also be integrally formed with the bevel gear support 8, which may reduce a length for interference fit required by interference press-fit or even avoid the interference press-fit, thus further reducing the axial length of the centrally mounted driving mechanism.

In conventional technology, the bevel gear support 8 protrudes downward and is connected with the bevel gear driving end 9, and the interference fit with a certain theoretical length will be designed to ensure the strength and reliability of the connection. In other words, the length of the bevel gear driving end 9 and the bevel gear support 8 in close fit is greater than a certain theoretical value, in this case, the bevel gear is closer to downstream of the motor in the axial direction, which leads to a larger size in the axial direction, and a separate positioning member is required for positioning the bevel gear driving end 9. However, according to the present application, a portion where the bevel gear driving end 9 and the first annular protrusion 81 are fitted with each other is located in the groove 52, and an outer wall of the bevel gear support 8 surrounds the shaft portion of the planetary gear output bracket 5, so that a portion where the bevel gear support 8 is in interference fit with the bevel gear driving end 9 overlaps with the planetary gear output bracket 5 in the axial direction of the motor 2, which reduces the axial dimension of the overall structure. In addition, only the outer wall of the bevel gear support 8 is required to be provided with a positioning mechanism, and the structure for positioning is simple.

In order to optimize the above embodiment, a gasket 3 is provided on an upper end face of the planetary gear 4, and the gasket 3 is configured for preventing the planetary gear 4 from being worn and preventing the planetary gear 4 from playing in the axial direction thereof. The gasket 3 may be an annular-shaped gasket, and a central hole of the annular-shaped gasket is configured to allow the output shaft of the motor 2 to pass through.

In the conventional technology, a holder of the conventional planetary gear 4 includes an upper holder and a lower holder, an end of a positioning shaft of the planetary gear 4 is in clearance fit with the upper holder, and another end of the positioning shaft of the planetary gear 4 is in interference fit with the lower holder. However, according to the present application, the gasket 3 is arranged between the housing 1 and the planetary gear 4, so that an upper end of the planetary gear 4 is not required to be provided with a holder, which further reduces the axial length of the whole structure. Moreover, since the upper holder is not provided, the positioning shaft of the planetary gear 4 is not required to be in clearance fit with the upper holder, which can avoid frictions, reduce losses and improve transmission efficiency.

Figure 4:
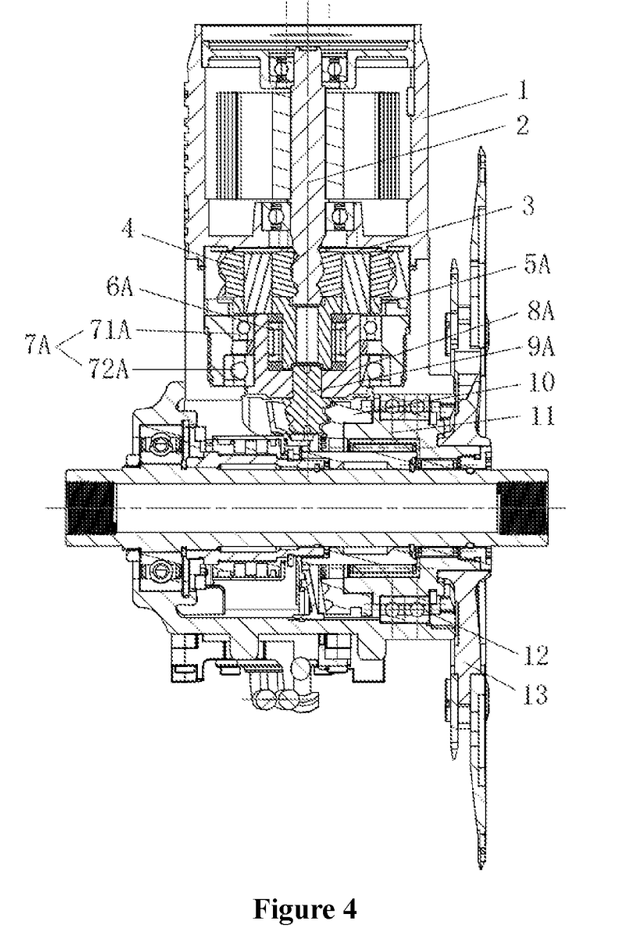
FIG. 4 is a schematic sectional view showing a centrally mounted driving mechanism for a power-assisted bicycle according to a second preferred embodiment of the present application.

As shown in FIG. 4, a centrally mounted driving mechanism for a power-assisted bicycle is provided according to a second preferred embodiment of the present application. The difference between the second preferred embodiment and the first preferred embodiment lies in a planetary gear output bracket 5A, a clutch 6A, a support assembly 7A, a bevel gear support 8A and a bevel gear driving end 9A. The planetary gear output bracket 5A is connected with the clutch 6A, the clutch 6A is connected with the bevel gear support 8A located outside the clutch 6A, the bevel gear support 8A is connected with the bevel gear driving end 9A, and the support assembly 7A surrounds the bevel gear support 8A.

Figure 5:
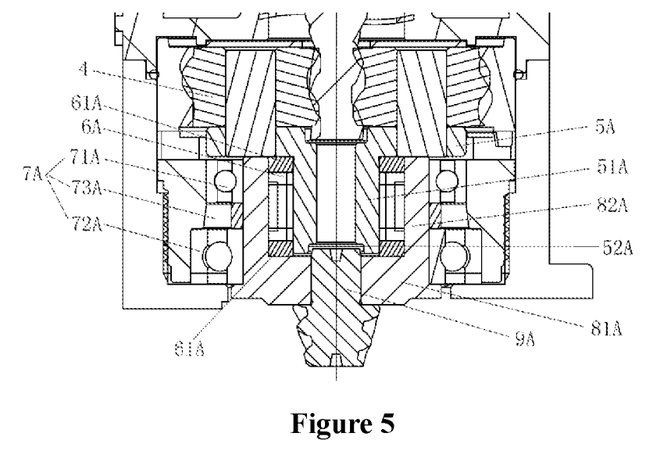
FIG. 5 is a schematic structural view showing the connection between a planetary gear output bracket and a bevel gear support in the second preferred embodiment.

Specifically, referring to FIG. 5, in the second preferred embodiment, the bevel gear support 8A is cup-shaped. The bevel gear support 8A has a bottom 81A and a second annular protrusion 82A. A through hole is provided at a central portion of the bottom 81A. The bevel gear driving end 9A is fixedly connected with the bevel gear support 8A through the through hole by means of interference fit, welding or threaded connection. The planetary gear output bracket 5A has a shaft portion 51A, and the shaft portion 5A is inserted into the second annular protrusion 82A. The clutch 6A is arranged between the shaft portion 51A and the second annular protrusion 82A, and the clutch 6A is fitted to and connected with the shaft portion 51A and the second annular protrusion 82A, to realize the connection and separation of the bevel gear support 8A and the planetary gear output bracket 5A. In order to ensure that the axial length of the whole structure will not be increased, a wedge-type clutch is preferably employed.

It should be noted that, a tail end of the bevel gear driving end 9A is provided with a transition structure to facilitate screwed installation, but the tail end of the bevel gear driving end 9A does not form strong connection with the planetary gear output bracket 5A. In order to further reduce the axial length, the tail end of the bevel gear driving end 9A is arranged to run through the bottom 81A, and a groove 52A is provided at a corresponding position of the shaft portion 51A. The tail end of the bevel gear driving end 9A extends into the groove 52A, and a gap is reserved between the tail end of the bevel gear driving end 9A and an inner wall of the groove 52A, so as to prevent interference during rotation.

A sliding bearing 61A is provided at each of two ends of the clutch 6A, and the sliding bearing 61A is supported between the shaft portion 51A and the second annular protrusion 82A. The position-limiting of the planetary gear output bracket 5A is realized through the two sliding bearings 61A, thereby avoiding deflection.

The support assembly 7A includes a first bearing 71A and a second bearing 72A arranged side by side. The first bearing 71A and the second bearing 72A are respectively arranged around a side portion of the second annular protrusion 82A, the first bearing 71A and the second bearing 72A are arranged to be spaced apart from each other, the first bearing 71A is arranged at an end of the side portion close to the planetary gear 4, and the second bearing 72A is arranged at another end of the side portion away from the planetary gear 4. With the arrangement that the first bearing 71A and the second bearing 72A are arranged to be spaced apart from each other, a distance between central support surfaces of the first bearing 71A and the second bearing 72A may be increased, which extends a support arm, thus providing more stable support for the bevel gear driving end 9A. Specifically, a spacer 73A is arranged between the two bearings to realize separation. The spacer 73A may be a gasket surrounding the bevel gear support 8A or a side protrusion integrally formed with the bevel gear support 8A.

Further, an inner diameter of the first bearing 71A is the same as that of the second bearing 72A, and an outer diameter of the first bearing 71A is less than that of the second bearing 72A. That is, a size of the second bearing 72A is greater than that of the first bearing 71A. The support assembly 7A forms a cantilever support structure for the bevel gear driving end 9A. Compared with the first bearing 71A, the second bearing 72A is closer to the bevel gear driving end 9A, and the second bearing 72A provides a stronger supporting force. With the arrangement that the size of the second bearing 72A is greater than that of the first bearing 71A, the distance between the central support surfaces of the first bearing 71A and the second bearing 72A may be further increased, which extends the support arm, and thus the support for the bevel gear driving end 9A is more stable.

Figure 6:
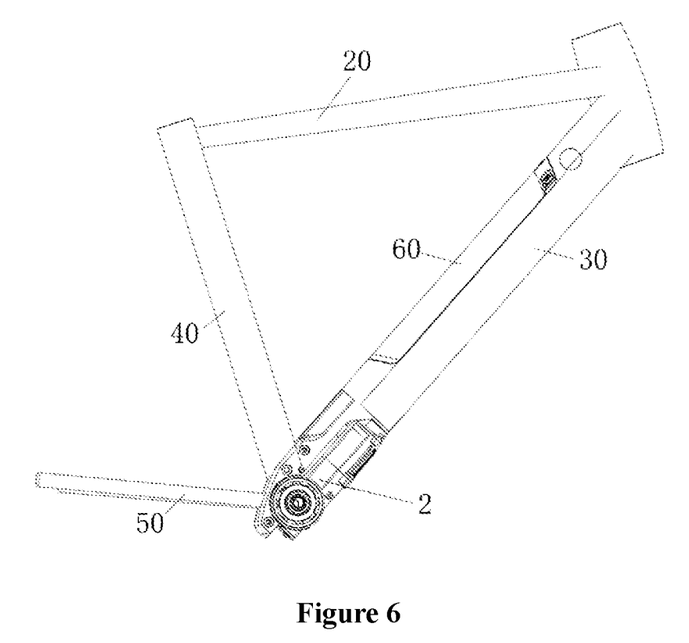
FIG. 6 is a schematic view showing the structure of a frame of a power-assisted bicycle employing the centrally mounted driving mechanism for the power-assisted bicycle according to the present application.

A power-assisted bicycle according to the present application includes the centrally mounted driving mechanism described in the preferred embodiments. As shown in FIG. 6, a frame of the power-assisted bicycle includes a top tube 20, a down tube 30, a seat tube 40, a chain stay 50 and a battery pack 60. The top tube 20, the down tube 30 and the seat tube 40 are sequentially connected end to end to form a triangle structure, and the chain stay 50 is connected with the down tube 30 to connect a rear wheel. The centrally mounted driving mechanism is mounted in the down tube 30, and the centrally mounted driving mechanism is located at an end of the down tube 30 connected with the seat tube 40. The battery pack 60 is also mounted in the down tube 30. Since the axial length of the centrally mounted driving mechanism is reduced, a remaining space in the down tube 30 is larger, so that more batteries may be accommodated in the down tube 30, and thus improving the battery life of the power-assisted bicycle. Other parts of the power-assisted bicycle may refer to the conventional technology, which are not described herein.

Based on the above description of the disclosed embodiments, those skilled in the art are capable of carrying out or using the present application. It is obvious for those skilled in the art to make many modifications to these embodiments. The general principle defined herein may be applied to other embodiments without departing from the scope of the present application. Therefore, the present application is not limited to the embodiments illustrated herein, but should be defined by the broadest scope consistent with the principle and novel features disclosed herein.

The invention claimed is:

1. A centrally mounted driving mechanism applicable to a power-assisted bicycle, comprising:
   a housing;
   a motor configured for providing a driving force;
   a planetary gear mechanism in transmission connection with a motor output shaft;
   a bevel gear driving end;
   a bevel gear driven end engaged with the bevel gear driving end, wherein the bevel gear driven end is connected with a crankset, and the planetary gear mechanism comprises a planetary gear and a planetary gear output bracket; and wherein
   the centrally mounted driving mechanism further comprises a bevel gear support sleeved outside the planetary gear output bracket, a clutch is provided between the planetary gear output bracket and the bevel gear support, and the planetary gear output bracket is in transmission connection with the bevel gear support through the clutch; and
   the bevel gear driving end is coaxially and fixedly connected with the bevel gear support, and a support assembly is provided outside the bevel gear support, and the support assembly is configured to support the planetary gear output bracket and the bevel gear driving end;
   the planetary gear output bracket has a shaft portion, the bevel gear support has a second annular protrusion, and the second annular protrusion is configured to surround the shaft portion;
   the clutch is arranged between the second annular protrusion and the planetary gear output bracket, and the clutch is fitted with and connected to the bevel gear support and the planetary gear output bracket, to realize connection and separation of the bevel support and the planetary gear output bracket; and
   the support assembly is arranged outside the second annular protrusion;
   the bevel gear support is provided with a first annular protrusion located at an inner side of the second annular protrusion, the bevel gear driving end is connected to an inner wall of the first annular protrusion; and
   a groove is provided at an end of the shaft portion away from the planetary gear, the first annular protrusion is inserted into the groove, and a gap is provided between the first annular protrusion and an inner wall of the groove.

2. The centrally mounted driving mechanism according to claim 1, wherein a sliding bearing is provided at each of two ends of the clutch, and the sliding bearing is supported between the shaft portion and the second annular protrusion.

3. A power-assisted bicycle, comprising:
the centrally mounted driving mechanism according to claim 2,
a down tube; and
a battery pack, wherein the centrally mounted driving mechanism and the battery pack are mounted in the down tube.

4. The centrally mounted driving mechanism according to claim 1, wherein the support assembly comprises a first bearing and a second bearing arranged to be spaced apart from each other, and the first bearing and the second bearing are respectively arranged around a side portion of the second annular protrusion.

5. The centrally mounted driving mechanism according to claim 4, wherein the first bearing is arranged at an end of the side portion close to the planetary gear, and the second bearing is arranged at another end of the side portion away from the planetary gear, an outer diameter of the first bearing is less than that of the second bearing.

6. A power-assisted bicycle, comprising:
the centrally mounted driving mechanism according to claim 4;
a down tube; and
a battery pack, wherein the centrally mounted driving mechanism and the battery pack are mounted in the down tube.

7. The centrally mounted driving mechanism according to claim 1, further comprising a crankset support, wherein the bevel gear driven end is connected to the crankset through the crankset support; and a bearing assembly configured for supporting and positioning the crankset support is provided between the crankset support and the housing.

8. The centrally mounted driving mechanism according to claim 1, wherein a gasket is provided on an upper end face of the planetary gear, and the gasket is configured for preventing the planetary gear from being worn and preventing the planetary gear from playing in an axial direction thereof.

9. A power-assisted bicycle, comprising:
the centrally mounted driving mechanism according to claim 1;
a down tube; and
a battery pack, wherein the centrally mounted driving mechanism and the battery pack are mounted in the down tube.

\* \* \* \* \*